(12) United States Patent
Kyoung (10) Patent No.: US 8,054,337 B2
(45) Date of Patent: Nov. 8, 2011

(54) METHODS AND APPARATUSES FOR SERIALIZING AND/OR DESERIALIZING VIDEO TIMING SIGNALS AND PARALLEL IMAGE DATA OUTPUT FROM AN IMAGE SENSOR

(75) Inventor: Seung-June Kyoung, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1074 days.

(21) Appl. No.: 11/657,647

(22) Filed: Jan. 25, 2007

(65) Prior Publication Data

US 2007/0177028 A1   Aug. 2, 2007

(30) Foreign Application Priority Data

Feb. 1, 2006   (KR) ................. 10-2006-0009839

(51) Int. Cl.
*H04N 5/228* (2006.01)
(52) U.S. Cl. .................................... 348/222.1
(58) Field of Classification Search .............. None
See application file for complete search history.

(56) References Cited

U.S. PATENT DOCUMENTS

| 5,351,130 | A  | * | 9/1994  | Dugan et al. ........... 348/725 |
| 7,259,780 | B2 | * | 8/2007  | Noguchi ............ 348/207.11 |
| 7,557,849 | B2 | * | 7/2009  | Pan et al. ............... 348/312 |
| 2002/0196351 | A1 |   | 12/2002 | Noguchi |
| 2005/0201537 | A1 | * | 9/2005  | Honda ............... 379/100.17 |
| 2007/0085909 | A1 | * | 4/2007  | Takagi ............... 348/207.99 |

FOREIGN PATENT DOCUMENTS

| JP | 10-257398    | 9/1998 |
| JP | 2004-208162  | 7/2004 |
| JP | 2004-266745  | 9/2004 |
| KR | 10-2003-0001309 | 1/2003 |

* cited by examiner

*Primary Examiner* — Luong T Nguyen
(74) *Attorney, Agent, or Firm* — Harness, Dickey & Pierce, P.L.C.

(57) ABSTRACT

A signal processing method and apparatus are provided. A method of serializing signals output from an image sensor is provided which includes sampling a vertical synchronization signal, a horizontal synchronization signal, and parallel image data output from the image sensor, at a first edge of a clock signal, for n cycles of the clock signal, where n is an integer. The method further includes generating a packet including information regarding timing parameters and valid image data based on the sampling result.

17 Claims, 7 Drawing Sheets

Packet.header.data_first =2
Packet.header.front_porch_dur=0
Packet.header.vsync_dur=0
Packet.header.back_porch_dur=0
Packet.header.hrsep_dur=6
Packet.header.data_last=2

METHODS AND APPARATUSES FOR SERIALIZING AND/OR DESERIALIZING VIDEO TIMING SIGNALS AND PARALLEL IMAGE DATA OUTPUT FROM AN IMAGE SENSOR

PRIORITY STATEMENT

This application claims priority under 35 U.S.C. § 119 to Korean Patent Application No. 10-2006-0009839, filed on Feb. 1, 2006, in the Korean Intellectual Property Office (KIPO), the entire contents of which are incorporated herein by reference.

BACKGROUND

Example embodiments may relate to signal processing. For example, example embodiments may relate to methods and apparatuses for effectively serializing and/or deserializing video timing signals and parallel image data that may be output from an image sensor.

CONVENTIONAL ART

Figure 1:
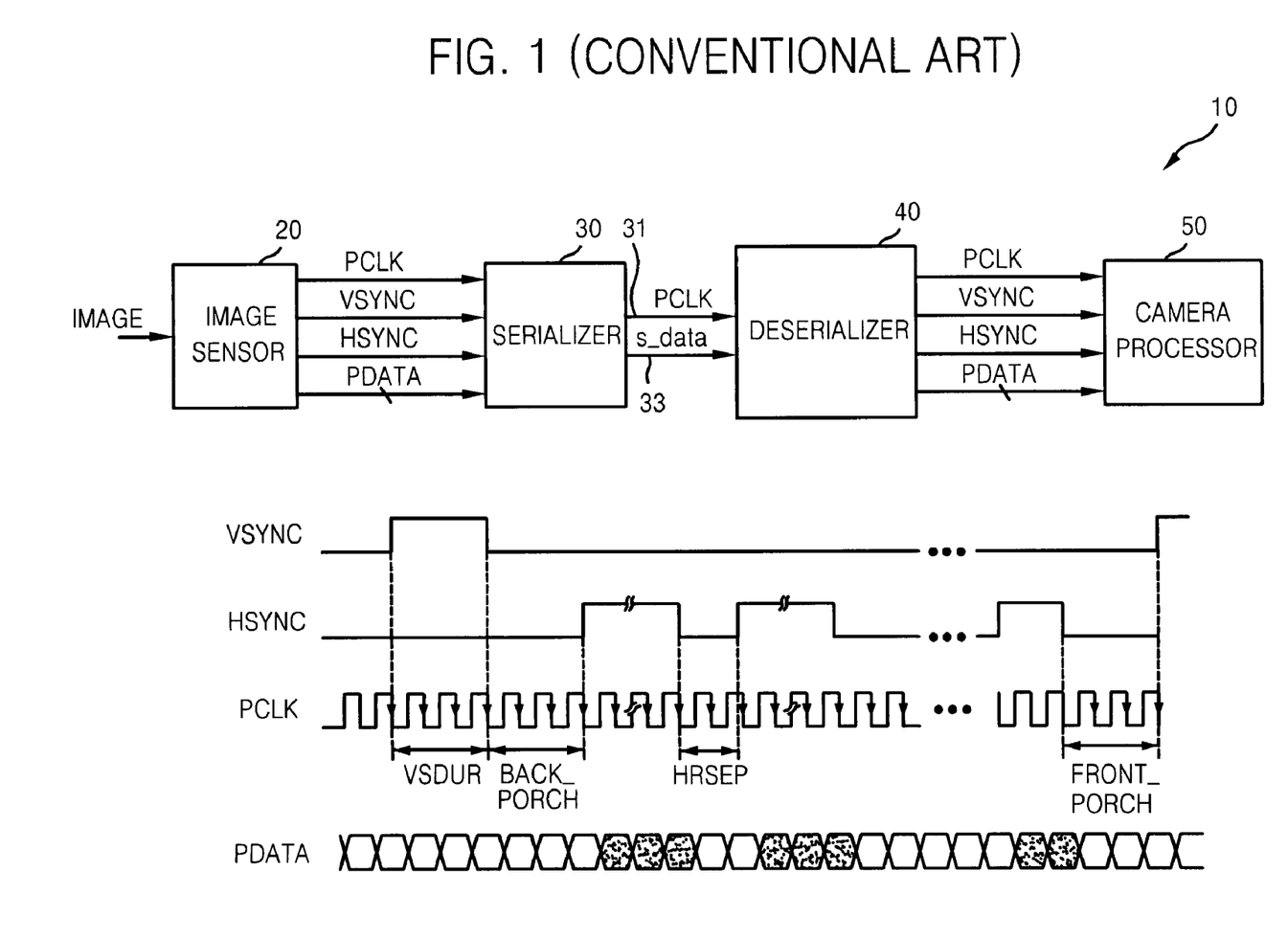
FIG. 1 is a block diagram of a conventional image processing system having a serializer and a deserializer.

FIG. 1 is a block diagram of a conventional image processing system 10 having a serializer 30 and a deserializer 40. Referring to FIG. 1, the system 10 may also include an image sensor 20, a first transmission line 31, a second transmission line 33, and a camera processor 50.

The image sensor 20 may sense an image, and generate a clock signal PCLK, a vertical synchronization signal VSYNC, a horizontal synchronization signal HSYNC, and parallel image data PDATA, corresponding to the sensed image.

The serializer 30 may sample the vertical synchronization signal VSYNC, the horizontal synchronization signal HSYNC, and the parallel image data PDATA at each edge (e.g., falling edge) of the clock signal PCLK. The serializer 30 may serialize and output a sampling result.

The first transmission line 31 may transmit the clock signal PCLK, and the second transmission line 33 may transmit data s_data serialized by the serializer 30. The deserializer 40 may receive the clock signal PCLK and the serialized data s_data, and may restore the vertical synchronization signal VSYNC, the horizontal synchronization signal HSYNC, and the parallel image data PDATA.

The camera processor 50 may restore an image based on the vertical synchronization signal VSYNC, the horizontal synchronization signal HSYNC, and the parallel image data PDATA restored by the deserializer 40.

If the system 10 is constructed as illustrated in FIG. 1, it may be possible to reduce the number of transmission lines across a hinge of a mobile phone in which an image sensor 20 and a camera processor 50 are located at an upper clamshell and a lower clamshell, respectively, thereby reducing manufacturing costs and the rate of bad products.

The serializer 30 may sample the vertical synchronization signal VSYNC, the horizontal synchronization signal HSYNC, and the parallel image data PDATA, and may transmit the serialized data s_data via the second transmission line 33 at each edge of the clock signal PCLK, thereby increasing a bandwidth of the second transmission line 33.

That is, the performance of the second transmission line 33 may be degraded, since the serializer 30 performs serialization even in durations in which valid pixel data is not present (e.g., a VSDUR duration, a BACK_PORCH duration, a HRSEP duration, and a FRONT_PORCH duration as depicted in FIG. 1) and outputs the vertical synchronization signal VSYNC and the horizontal synchronization signal HSYNC for each cycle of the clock signal PCLK.

As may be well-known to a person of ordinary skill in the art, the "VSDUR duration" may indicate a duration the vertical synchronization signal VSYNC remains in an active state ("high" level or data "1"). The "BACK_PORCH duration" may indicate a duration from which the vertical synchronization signal VSYNC transitions from an active state to a deactive (e.g., inactive) state ("low" level or data "0"), and the horizontal synchronization signal HSYNC transitions from the deactive state to the activate state. The "HRSEP duration" may indicate a duration the horizontal synchronization signal HSYNC is in the deactive state between adjacent activated horizontal synchronization signals HSYNC while the vertical synchronization signal VSYNC is deactivated. The "FRONT_PORCH duration" may indicate a duration from which the horizontal synchronization signal HSYNC transitions from the active state to the deactive state and the vertical synchronization signal VSYNC transitions from the deactive state to the active state.

As a solution to the problem discussed above with regard to the system 10 illustrated in FIG. 1, the serializer 30 may sample a parallel image data PDATA and transmit valid pixel image data thereof.

Figure 2:
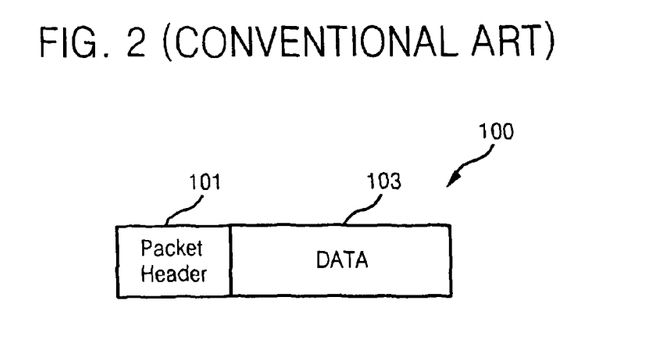
FIG. 2 is a diagram illustrating a packet generated by a conventional serializer.

FIG. 2 is a diagram illustrating an example of a packet 100 generated by a conventional serializer. As illustrated in FIG. 2, data serialized by the serializer (not shown) may be transformed into the packet 100 having a simple structure. The packet 100 may include a packet header 101 and data 103.

The serializer may sort out a vertical synchronization signal VSYNC and valid pixel image data according to the type of the packet header 101. That is, the serializer may output the valid pixel image data and/or the vertical synchronization signal VSYNC. In this example, information regarding a VSDUR duration, a BACK_PORCH duration, a HRSEP duration, and a FRONT_PORCH duration may be set in a deserializer (not shown). Accordingly, the deserializer may receive the valid pixel image data and/or the vertical synchronization signal VSYNC, and may restore signals VSYNC, HSYNC, and PDATA generated by an image sensor.

However, when at least one of the VSDUR duration, the BACK_PORCH duration, the HRSEP duration, or the FRONT_PORCH duration changes, the deserializer may not restore the signals generated by the image sensor, based on the signal(s) received from the serializer.

SUMMARY

Example embodiments may provide a method and apparatus for serializing parallel image data, a vertical synchronization signal, and a horizontal synchronization signal output from an image sensor, such that the bandwidth of a serial line may be reduced and the length of a changed timing parameter may be reflected in deserialization.

Example embodiments may provide a method and apparatus for deserializing serialized signals to restore signals that may be similar to signals output from an image sensor.

Example embodiments may provide methods and apparatuses for serializing and deserializing.

According to an example embodiment, a method of serializing signals output from an image sensor may include sampling a vertical synchronization signal, a horizontal synchronization signal, and parallel image data output from the image sensor, at a first edge of a clock signal, for n cycles of the clock signal, where n is an integer. The method may further include generating a packet including information regarding timing parameters and valid image data based on the sampling result.

In an example embodiment, the information regarding timing parameters includes at least one of information regarding an amount of a first valid image data, information regarding a length of a front porch duration, information regarding a length of duration of an active state of the vertical synchronization signal, information regarding a length of a back porch duration, information regarding a length of duration of a deactive state of the horizontal synchronization signal, the deactive state is between adjacent activated horizontal synchronization signals while the vertical synchronization signal is deactivated, and information regarding an amount of second valid image data.

In an example embodiment, the information regarding the timing parameters may further include information regarding a type of the packet.

In an example embodiment, each of the lengths may be represented by cycles of the clock signal.

According to an example embodiment, a method of processing signals may include a method of serializing signals and receiving a packet including information regarding timing parameters and valid image data from an image sensor. The method of processing signals may further include restoring a vertical synchronization signal, a horizontal synchronization signal, and parallel image data for n cycles of a clock signal based on at least one of the clock signal, the information regarding the timing parameters, and the valid image data.

In an example embodiment, the method may further include transmitting the clock signal via a first transmission line and the packet via a second transmission line.

According to an example embodiment, a method of deserializing signals output from a serializer may include receiving a packet including information regarding timing parameters and valid image data from an image sensor and restoring a vertical synchronization signal, a horizontal synchronization signal, and parallel image data for n cycles of a clock signal based on at least one of the clock signal, the information regarding the timing parameters, and the valid image data.

According to an example embodiment, an apparatus for processing data may include a serializer for sampling a vertical synchronization signal, a horizontal synchronization signal, and parallel image data, which are output from an image sensor, at a first edge of a clock signal for n cycles of the clock signal, and for generating a packet including information regarding timing parameters and valid image data, based on the sampling result, where n is an integer.

In an example embodiment, the image sensor generates and outputs the clock signal, the vertical synchronization signal, the horizontal synchronization signal, and the parallel image data in response to a sensed image.

In an example embodiment, the information regarding timing parameters may include at least one of nformation regarding an amount of a first valid image data, information regarding a length of a front porch duration, information regarding a length of duration of an active state of the vertical synchronization signal, information regarding a length of a back porch duration, information regarding a length of duration of a deactive state of the horizontal synchronization signal, the deactive state is between adjacent activated horizontal synchronization signals while the vertical synchronization signal is deactivated, and information regarding an amount of second valid image data.

In an example embodiment, the information regarding the timing parameters further includes information regarding a type of the packet.

In an example embodiment, each of the lengths may be represented by cycles of the clock signal.

In an example embodiment, the apparatus for processing data may further include a deserializer for receiving the packet and restoring the vertical synchronization signal, the horizontal synchronization signal, and the parallel image data for the n cycles of the clock signal based on at least one of the clock signal, the information regarding the timing parameters, and the valid image data.

In an example embodiment, the apparatus for processing data may further include a first transmission line and a second transmission line, where the clock signal is transmitted on the first transmission line and the packet is transmitted on the second transmission line.

In an example embodiment, the apparatus for processing data may further include a camera processor for processing an image sensed by the image sensor, based on the clock signal, the restored vertical synchronization signal, the restored horizontal synchronization signal, and the restored parallel image data.

According to an example embodiment, an apparatus for processing data may include a deserializer for receiving a packet comprising information regarding timing parameters and valid image data, and for restoring a vertical synchronization signal, a horizontal synchronization signal, and parallel image data for n cycles of a clock signal based on at least one of the clock signal, the information regarding the timing parameters, and the valid image data, where n is an integer.

In an example embodiment, the information regarding the timing parameters may include at least one of information regarding an amount of a first valid image data, information regarding a length of a front porch duration, information regarding a length of duration of an active state of the vertical synchronization signal, information regarding a length of a back porch duration, information regarding a length of duration of a deactive state of the horizontal synchronization signal, the deactive state is between adjacent activated horizontal synchronization signals while the vertical synchronization signal is deactivated, and information regarding an amount of second valid image data.

In an example embodiment, the apparatus for processing data may further include a camera processor for processing an image sensed by an image sensor, based on the clock signal, the restored vertical synchronization signal, the restored horizontal synchronization signal, and the restored parallel image data.

According to an example embodiment, a system for processing data may include an image sensor for sensing an image, and for generating and outputting a clock signal, a vertical synchronization signal, a horizontal synchronization signal, and image data corresponding to the sensed image. The system may further include a serializer for sampling the vertical synchronization signal, the horizontal synchronization signal, and the parallel image data, at a first edge of the clock signal for n cycles of the clock signal, and for generating a packet including information regarding timing parameters and valid image data, based on the sampling result, where n is an integer. In example embodiments, the system may include a first transmission line for transmitting the clock signal and a second transmission line for transmitting the packet. In example embodiments, the system may further include a deserializer for receiving the packet output from the serializer; and for restoring the vertical synchronization signal, the horizontal synchronization signal, and the parallel image data for the n cycles of the clock signal, based on at least one of the clock signal, the information regarding the timing parameters, and the valid image data, and a camera processor for processing the sensed image based on the vertical synchronization signal, the horizontal synchronization signal, and the parallel image data output from the deserializer.

According to example embodiments, a packet may include a header portion. The header portion may include at least one of information regarding an amount of a first valid image data, information regarding a length of a front porch duration, information regarding a length of duration of an active state of the vertical synchronization signal, information regarding a length of a back porch duration, information regarding a length of duration of a deactive state of the horizontal synchronization signal, the deactive state is between adjacent activated horizontal synchronization signals while the vertical synchronization signal is deactivated, and information regarding an amount of second valid image data. In example embodiments, the packet may further include a data portion including valid image data.

In an example embodiment, the packet is generated by a serializer and transmitted via a transmission line to a deserializer.

In an example embodiment, the packet is stored on a computer readable storage medium.

Example embodiments may also provide a method of serializing signals output from an image sensor, the method including sampling a vertical synchronization signal, a horizontal synchronization signal, and parallel image data, (e.g., signals output from the image sensor) at a first edge of a clock signal for n (e.g., n is an integer) cycles of the clock signal. The method may further include generating a packet which may include information regarding timing parameters and valid image data, based on the sampling result.

Example embodiments may provide a method of deserializing packets output from a serializer, the method including receiving a packet including information regarding timing parameters and valid image data, which may be sampled at a first edge of a clock signal for n (e.g., n is an integer) cycles of the clock signal, from a serializer. The method may further include restoring a vertical synchronization signal, a horizontal synchronization signal, and parallel image data for the n cycles of the clock signal based on at least one of the clock signal, the information regarding the timing parameters, and the valid image data.

Example embodiments may provide a method of processing data. In the method, a serializer may sample a vertical synchronization signal, a horizontal synchronization signal, and a parallel image data (e.g., signals output from an image sensor) at a first edge of a clock signal for n cycles of the clock signal. The method may include generating a packet including information regarding timing parameters and valid image data, based on the sampling result, and may transmit the clock signal via a first transmission line and the packet via a second transmission line. A deserializer may restore the vertical synchronization signal, the horizontal synchronization signal (e.g., based on the clock signal) the parallel image data (e.g., based on the clock signal), the information regarding the timing parameters, and the valid image data.

Example embodiments may provide an apparatus for processing data. The apparatus may include an image sensor that may generate and output a clock signal, a vertical synchronization signal, a horizontal synchronization signal, and parallel image data corresponding to a sensed image. The apparatus may further include a serializer that may sample the vertical synchronization signal, the horizontal synchronization signal, and the parallel image data (e.g., signals output from the image sensor) at a first edge of the clock signal for n cycles of the clock signal. The serializer may generate a packet including information regarding timing parameters and valid image data, based on the sampling result.

Example embodiments may provide an apparatus for processing data. The apparatus may include a deserializer that may receive a packet including information regarding timing parameters and valid image data (which may be sampled at a first edge of a clock signal for n cycles of the clock signal) from a serializer, and may restore a vertical synchronization signal, a horizontal synchronization signal, and parallel image data for n cycles of the clock signal, based on the clock signal, and the information regarding the timing parameters. The apparatus may further include a camera processor that processes an image sensed by an image sensor, based on the clock signal, the restored vertical synchronization signal, the restored horizontal synchronization signal, and the restored parallel image data.

Example embodiments may provide a system for processing data. The system may include an image sensor that senses an image, and may generate and output a clock signal, a vertical synchronization signal, a horizontal synchronization signal, and/or data corresponding to the sensed image. The system may further include a serializer that may sample the vertical synchronization signal, the horizontal synchronization signal, and/or the parallel image data, which may be output from the image sensor, at a first edge of the clock signal for n cycles of the clock signal, and may generate a packet including information regarding timing parameters and valid image data based on the sampling result. The system may further include a first transmission line on which the clock signal may be transmitted, a second transmission line on which the packet may be transmitted, and a deserializer that receives the packet output from the serializer. The deserializer may restore the vertical synchronization signal, the horizontal synchronization signal, and/or the parallel image data for n cycles of the clock signal, based on the clock signal, the information regarding the timing parameters, and the valid image data. The system may further include a camera processor that may process the sensed image based on the vertical synchronization signal, the horizontal synchronization signal, and/or the parallel image data output from the deserializer.

The information regarding the timing parameters may include at least one of a total number of first valid image data, a length of a front porch duration a length of the duration of a vertical synchronization signal which is at an active state, a length of a back porch duration, a length of the duration of a horizontal synchronization signal that is at a deactive state between adjacent activated horizontal synchronization signals while the vertical synchronization signal is deactivated, and a total number of second valid image data.

The information regarding the timing parameters may further include a type of the packet and a length of each signal duration corresponds to n cycles of the clock signal.

Example embodiments will be more fully apparent from the following detailed description, the accompanying drawings, and the associated claims.

BRIEF DESCRIPTION OF THE DRAWINGS

Example embodiments will become more apparent by describing them in detail with reference to the attached drawings in which.

DETAILED DESCRIPTION OF EXAMPLE EMBODIMENTS

Detailed illustrative embodiments are disclosed herein. However, specific structural and functional details disclosed herein are merely representative for purposes of describing example embodiments. This invention may, however, may be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 3:
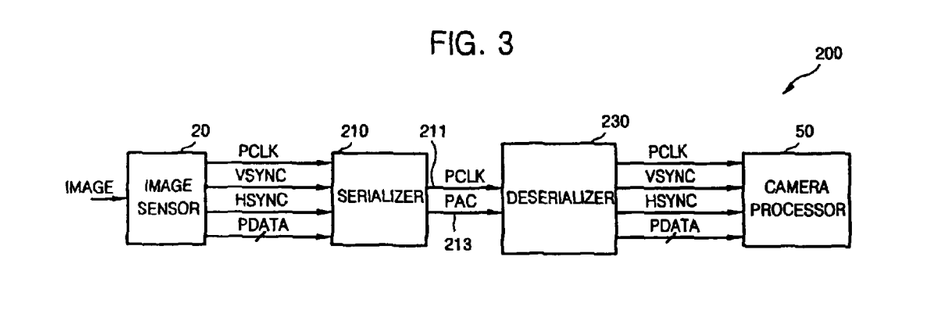
FIG. 3 is a block diagram of a system having a serializer and a deserializer, according to an example embodiment.

FIG. 3 is a block diagram of a system having a serializer and a deserializer, according to an example embodiment. The system 200 may be implemented as a camera included in a mobile phone, or an apparatus having an image sensor and an image processor, but should not limited to these examples.

Referring to FIG. 3, the system 200 may include an image sensor 20, a serializer 210, a first transmission line 211, a second transmission line 213, a deserializer 230, and a camera processor (or an image processor) 50.

The image sensor 20 may sense an image and may output a clock signal PCLK, a vertical synchronization signal VSYNC, a horizontal synchronization signal HSYNC, and/or parallel image data PDATA corresponding to the sensed image. The parallel image data PDATA may be embodied as n-bit data (where n is a natural number). For example, n=8.

Figure 6:
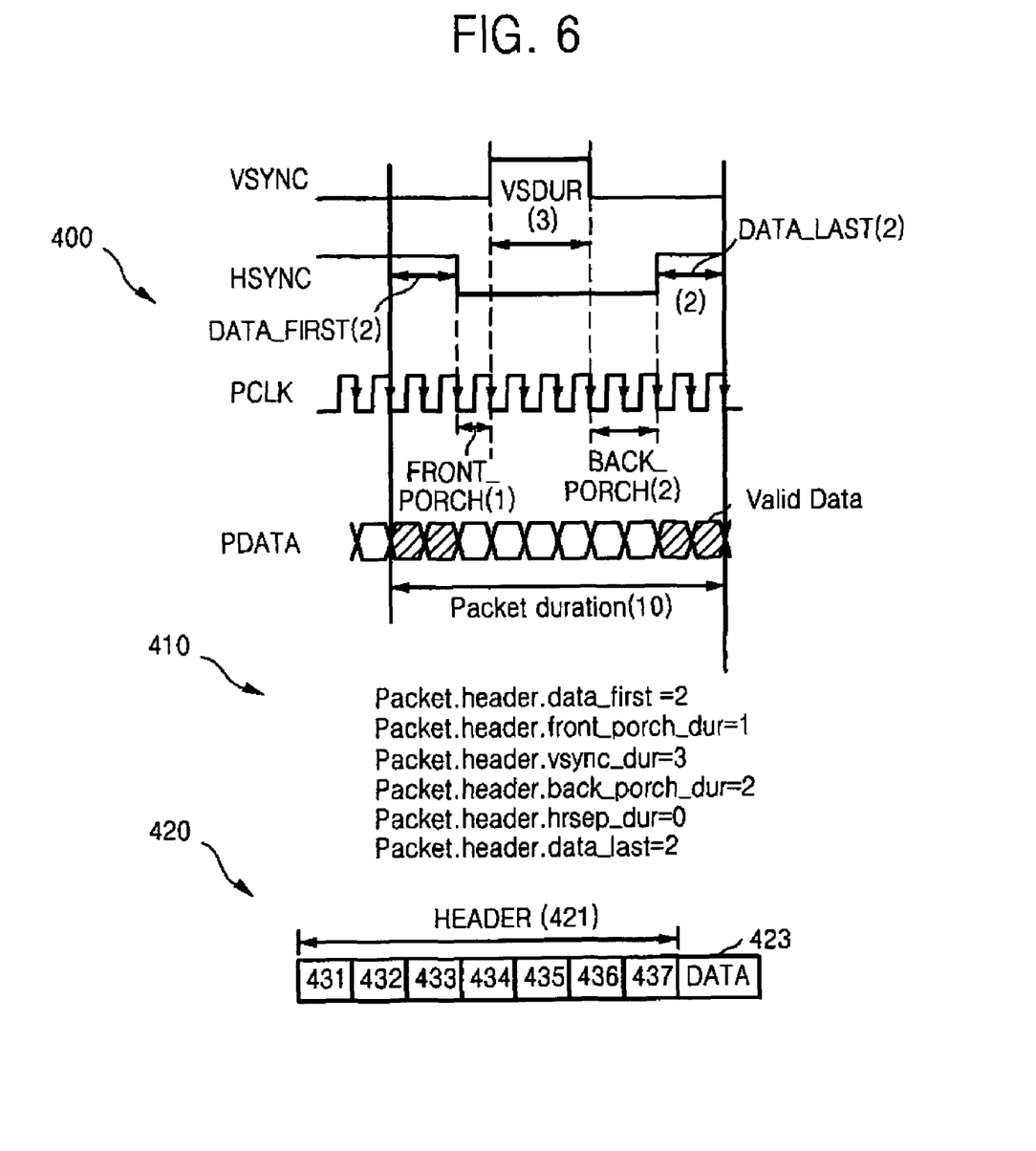
FIG. 6 is a diagram illustrating a method of generating a first mixed type packet using the serializer illustrated in FIG. 3, according to an example embodiment.
Figure 7:
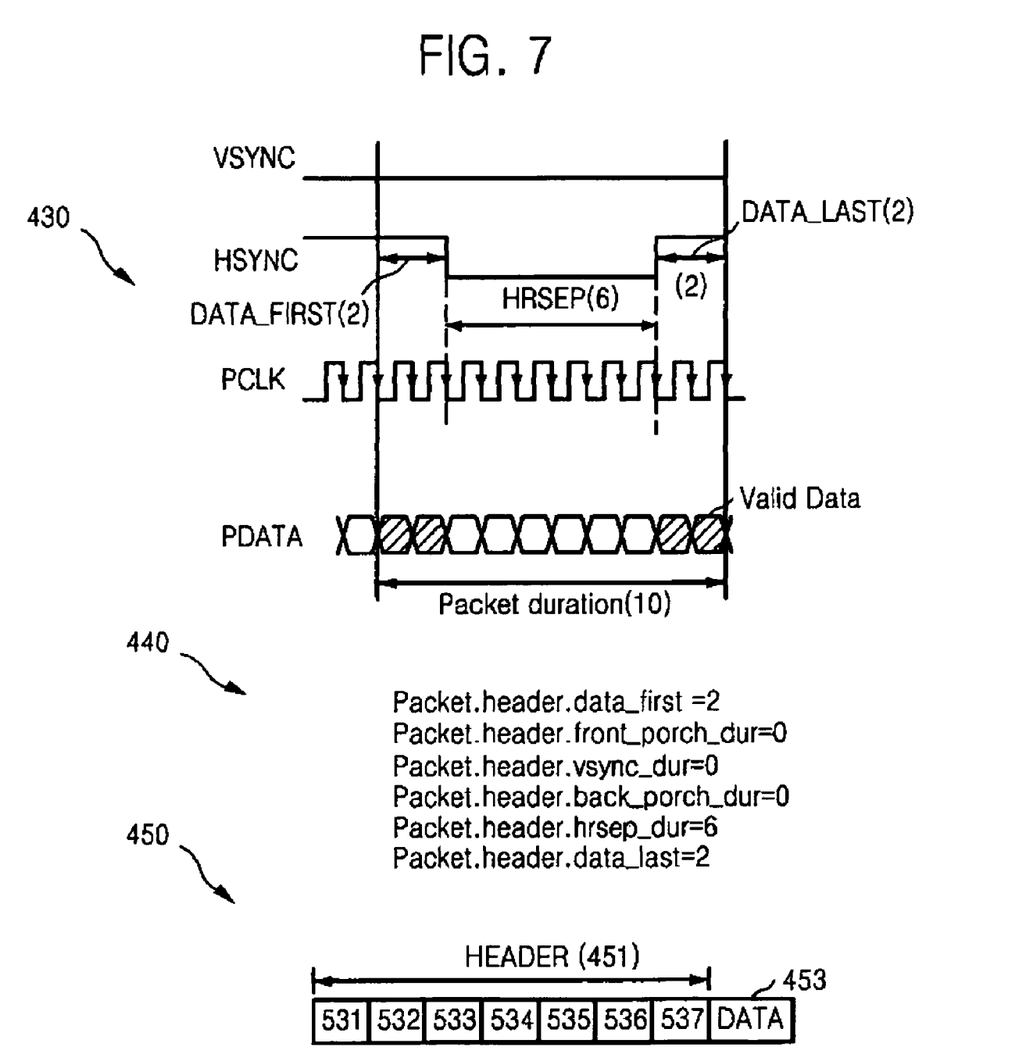
FIG. 7 is a diagram illustrating a method of generating a second mixed type packet by using the serializer illustrated in FIG. 3 according to an example embodiment.

As illustrated in FIG. 6 and/or 7, for N (where N is an integer, e.g., N=10) cycles of the clock signal PCLK, the serializer 210 may sample the vertical synchronization signal VSYNC, the horizontal synchronization signal HSYNC, and/or the parallel image data PDATA output from the image sensor 20 at a first edge (e.g., a falling edge) of the clock signal PCLK. The serializer 210 may generate a packet (e.g., PAC) 300, 420, or 450 including timing parameter information and/or valid image data, based on the sampling result.

The clock signal PCLK may be transmitted to the deserializer 230 via the first transmission line 211, and the packet (e.g., PAC) 300, 420, or 450, generated by the serializer 210, may be transmitted to the deserializer 230 via the second transmission line 213.

The deserializer 230 may receive the clock signal PCLK and the packet (e.g., PAC) 300, 420, or 450 from the serializer 210 and may restore the vertical synchronization signal VSYNC, the horizontal synchronization signal HSYNC, and/or the parallel image data PDATA for the N cycles of the clock signal PCLK based on the clock signal PCLK, the timing parameter information, and/or the valid image data.

The camera processor 50 may process (e.g., reproduce) an image sensed by the image sensor 20 in response to the vertical synchronization signal VSYNC, the horizontal synchronization signal HSYNC, and/or the parallel image data PDATA that are restored by the deserializer 230.

Figure 4:
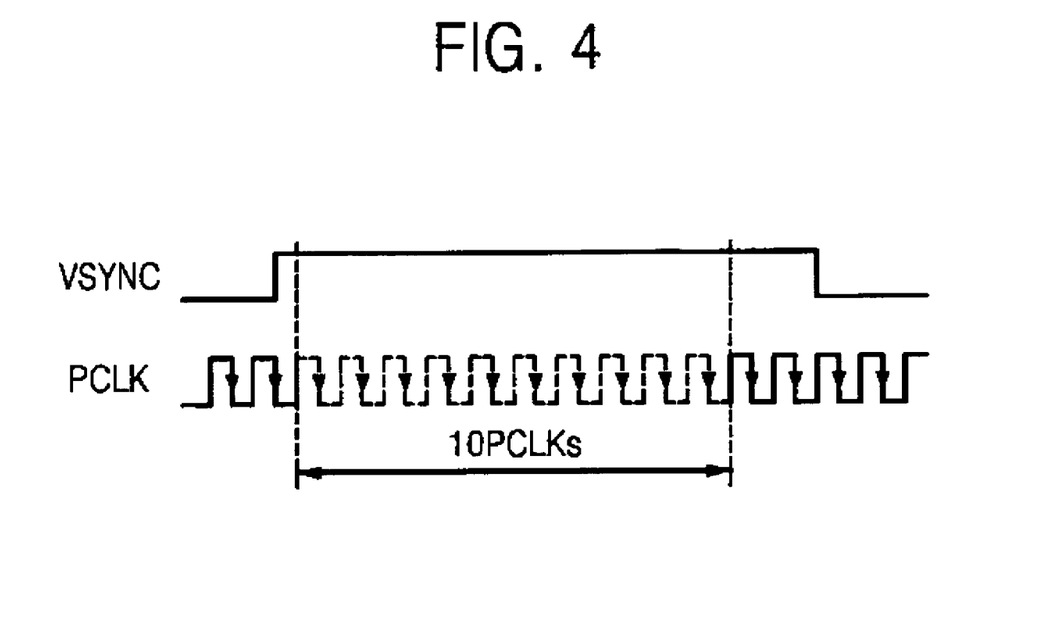
FIG. 4 is a waveform of a vertical synchronization signal sampled according to an example embodiment.

FIG. 4 is a waveform of a vertical synchronization signal VSYNC sampled according to an example embodiment.

Figure 5:
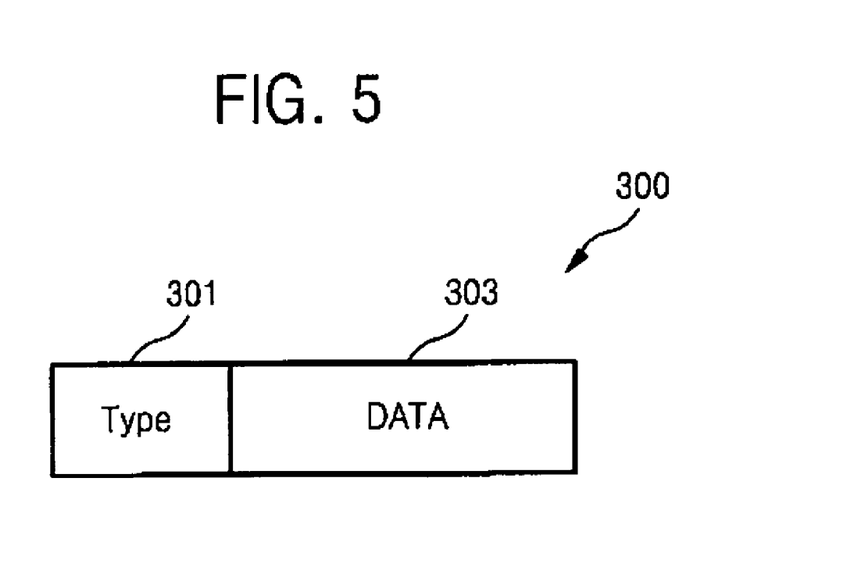
FIG. 5 is a diagram illustrating a uniform-type packet according to an example embodiment.

FIG. 5 is a diagram illustrating a uniform type packet 300 according to an example embodiment.

Referring to FIG. 3-5, the serializer 210 may generate a uniform type packet 300 illustrated in FIG. 5 by sampling a logic state (e.g., a high level or a low level) of the vertical synchronization signal VSYNC at a first edge (e.g., a falling edge) of the clock signal PCLK for a plurality of cycles (e.g., ten) of clock signal PCLK.

Referring to FIG. 5, the uniform type packet 300 may include a packet header 301 and data 303. The packet header

301 may include information regarding the type of the packet 300, and the data 303 may include valid image data and/or valid pixel image data.

If the information in the packet header 301 indicates "DATA", valid image data or only valid image data may be supplied to the serializer 210 for the ten cycles of the clock signal PCLK, and thus, the packet 300 includes only the valid image data. Therefore, the data 303 may contain valid image data corresponding to the ten cycles of clock signal PCLK.

If the information in the packet header 301 indicates "VSYNC", the vertical synchronization signal VSYNC, activated for the ten cycles of the clock signal PCLK as illustrated in FIG. 4, is input to the serializer 210. In an example embodiment, the packet 300 may include the vertical synchronization signal VSYNC. If the information in the packet header 301 indicates "BACK_PORCH", "HRSEP", or "FRONT_PORCH", the packet 300 may include a "BACK_PORCH", a "HRSEP", or a "FRONT_PORCH".

The packet 300 may be implemented in software, for example, as any suitable computer program and stored in any computer readable storage medium. For example, a method in accordance with one or more example embodiments may be a computer program product causing a computer (or processor such as an image processor, and/or a computer program product including an image processor) to execute one or more of the example methods described herein.

The computer program product may include a computer-readable medium having computer program logic or code portions embodied thereon for enabling a processor of the apparatus to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it may be separated from the computer main body. For example, the computer main body may be a clamshell-type cell phone which may include an image sensor on an upper clam-shell, and an image processor on a lower clam shell. However, example embodiments should not be limited to such. Examples of the built-in medium may include, but are not limited to, rewriteable non-volatile memories, such as RAMs, ROMs, flash memories (e.g., NAND flash), and hard disks (e.g., magnetic spinning magnetic hard disks or non-removable optical recording media). Examples of a removable medium may include, but are not limited to, optical storage media such as CD-ROMs, DVDs, and other newer formats such as high-definition capable optical recoding media; magneto-optical storage media such as MOs; magnetic storage media such as floppy disks (trademark), cassette tapes, and removable hard disks; media with a built-in rewriteable non-volatile memory such as memory cards; and media with a built-in ROM, such as ROM cassettes.

These packets and programs may also be provided in the form of an externally supplied propagated signal and/or a computer data signal (e.g., wireless or terrestrial) embodied in a carrier wave. The computer data signal embodying one or more instructions or functions of an example methodology may be carried on a carrier wave for transmission and/or reception by an entity that executes the instructions or functions of the example methodology. For example, the functions or instructions of the example embodiments may be implemented by processing one or more code segments of the carrier wave, for example, in a computer or by an image processor, where instructions or functions may be executed for simulating arbitrary software and/or unmodified code directly on a host processor, in accordance with example embodiments of the present invention.

Further, such programs, when recorded on computer-readable storage media, may be readily stored and distributed. The storage medium, as it is read by a computer (or by other means), may enable the simulation of arbitrary software and/or unmodified code directly on a host processor, in accordance with the example embodiments.

The deserializer 230 may restore the vertical synchronization signal VSYNC shown in FIG. 4 which may be output from the image sensor 20 based on the packet header 301 and the data 303 of the packet (e.g., PAC) 300 output from the serializer 210. For example, because the deserializer 230 may have already recognized a sampling duration (or, sampling time) in which the serializer 210 performed sampling (e.g., n cycles of the clock signal PCLK, where n is a natural number), it may restore the signals VSYNC, HSYNC, and PDATA output from the image sensor 20 based on the packet header 301 and the data 303.

FIG. 6 is a diagram illustrating a method of generating a first mixed type packet 420 using the serializer 210 illustrated in FIG. 3, according to an example embodiment. Referring to FIGS. 3 and 6, the serializer 210 may sample a vertical synchronization signal VSYNC, a horizontal synchronization signal HSYNC, and parallel image data PDATA at a falling edge of a clock signal PCLK in units of n cycles of the clock signal PCLK (e.g., for ten cycles of the clock signal PCLK where n is a natural number). In another example embodiment, the sampling may be performed at a rising edge of the clock signal PCLK.

"DATA_FIRST" denotes a first valid image data duration, and "DATA_LAST" denotes a second valid image data duration. The number in each parenthesis indicates a total number of data and/or a length of signal duration. The length of each of the above signal durations may be counted using cycles of the clock signal PCLK.

"Packet.header.data_first=2" denotes a total number of valid image data present in the first valid image data duration DATA_FIRST corresponding to two cycles of clock signal PCLK. The total number (units) of the valid image data may be expressed with bits or bytes. For example, the total number of valid image data may be the amount of valid image data present in the first valid image data duration DATA_FIRST.

"Packet.header.front_porch_dur=1" denotes a length of a front porch duration FRONT_PORCH corresponding to a cycle of the clock signal PCLK.

"Packet.header.vsync_dur=3" denotes a length of an activated vertical synchronization signal duration VSDUR corresponding to three cycles of the clock signal PCLK.

"Packet.header.back_porch=2" indicates a length of a back porch duration BACK_PORCH corresponding to two cycles of the clock signal PCLK.

"Packet.header.hrsep=0" indicates that a HRSEP duration is not present.

"Packet.header.data_last=2" indicates a total number or information (e.g., 2 bytes or 16 bits) corresponding to valid image data present in a second valid image data duration DATA_LAST corresponding to two cycles of the clock signal PCLK. For example, the total number of valid image data may be the amount of valid image data present in the second valid image data duration.

The first mixed type packet 420 may include a packet header 421 and data 423. The packet header 421 may include a part 431 containing information regarding the type of the packet 400 (a uniform type (e.g., data "0") or a mixed type (e.g., data "1")), and parts 432 through 437 containing timing parameter information.

The part 432 may include information (e.g., Packet.header.data_first=2) regarding a total number of a first valid image data. The part 433 may include information (e.g., Packet.header.front_porch_dur=1) regarding a length of the front porch duration. The part 434 may include information (e.g., Packet.header.vsync_dur=3) regarding a length of the VSDUR duration. The part 435 may include information (e.g., Packet.header.back_porch_dur=2) regarding a length of the back porch duration. The part 436 may include information (e.g., Packet.header.hrsep_dur=0) regarding a length of the HRSEP duration. The part 437 may include information (e.g., Packet.header.data_last=2) regarding a total number of a second valid image data. Here, the number in each of the above parameters may be expressed with binary bits (e.g., '10'=2 or '11'=3) but is not limited to the particular number shown.

The data 432 may include valid image data corresponding to information (e.g., Packet.header.data_first=2) indicating the total number of the first valid image data, and valid image data corresponding to information (e.g., Packet.header.data_last=2) indicating the total number of the second valid image data.

The part 431, regarding the packet type, may include information indicating whether the packet generated by the serializer 210 is a uniform type or a mixed type.

That the packet 300 is the uniform type indicates that the packet 300 may include the VSYNC signal, the HSYNC signal, the BACK_PORCH signal, the HRSEP signal, or the FRONT_PORCH signal, as described with reference to FIGS. 4 and 5. That the packet 300 is the mixed type indicates that the packet 300 may be a mixture of timing parameters and valid image data as illustrated in FIGS. 6 and 7. In some example embodiments, the part 431 regarding the packet type may be included in, or alternatively separately from, the timing parameter.

The serializer 210 may generate a mixed type packet 420 having information regarding the timing parameters 410 based on a timing diagram 400 of FIG. 6, and may supply the generated packet (PAC) 420 to the deserializer 230 via the second transmission line 213.

As discussed above with regards to the packet 300, packets according to example embodiments may be implemented in software, for example, as any suitable computer program and stored in any computer readable storage medium. For example, a method in accordance with one or more example embodiments may be a computer program product causing a computer (or processor such as an image processor, and/or a computer program product including an image processor) to execute one or more of the example methods described herein.

The deserializer 230 may recognize the length (that is, n cycles of the clock signal PCLK) of the packet 420 generated by the serializer 210, and may restore signals (e.g., signals as illustrated in timing diagram 400 of FIG. 6) by analyzing the packet header 421 and the data 423.

That is, the deserializer 230 may restore waveforms of a vertical synchronization signal VSYNC, a horizontal synchronization signal HSYNC, and/or valid image data PDATA based on information (e.g., Packet.header.data_first=2) regarding the total number of the first valid image data and/or the valid image data contained in the data 423.

Further, as illustrated in FIG. 6, the deserializer 230 may restore waveforms of a vertical synchronization signal VSYNC and/or a horizontal synchronization signal HSYNC generated by the image sensor 20, based on Packet.header.front_porch_dur=1, Packet.header.vsync_dur=3, Packet.header.back_porch=2, and Packet.header.hrsep=0. Therefore, even if the VSDUR duration, the BACK_PORCH duration, the HRSEP duration, and/or the FRONT_PORCH duration changes, the deserializer 230, according to an example embodiment, may restore the signals VSYNC, HSYNC, and PDATA output from the image sensor 20.

FIG. 7 is a diagram illustrating a method of generating a second mixed type packet by using the serializer of FIG. 3, according to an example embodiment. Referring to FIG. 7, the packet 450 may include a packet header 451 and data 453. The packet header 451 may include a part 531 containing information regarding the type of the packet 450, and may further include parts 532 through 537, each containing timing parameters.

Figure 8:
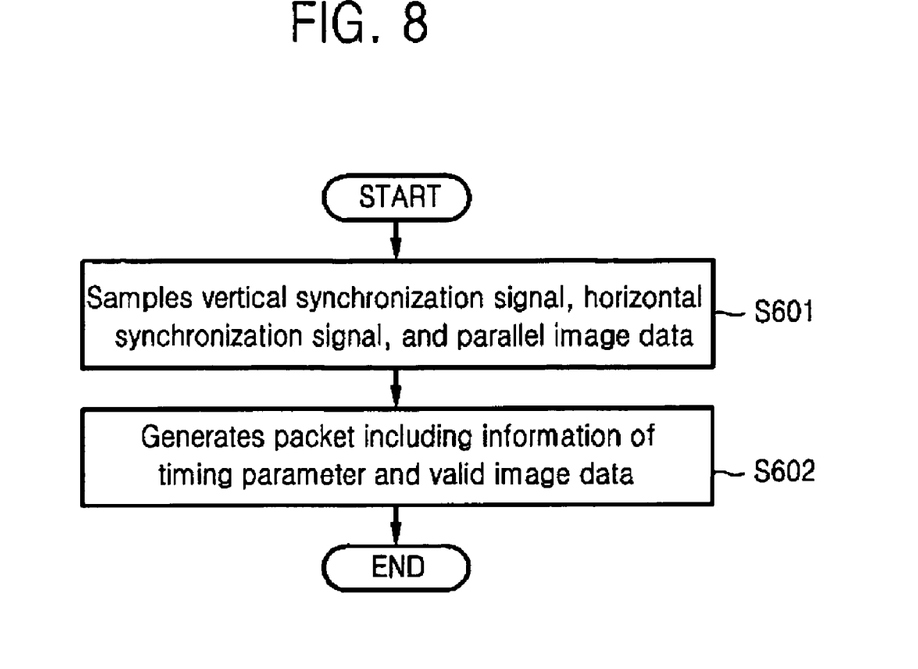
FIG. 8 is a flowchart illustrating a serializing method according to an example embodiment.

FIG. 8 is a flowchart illustrating a serializing method according to an example embodiment. Referring to FIG. 3 through 8, the serializer 210 may sample a vertical synchronization signal VSYNC, a horizontal synchronization signal HSYNC, and parallel image data PDATA illustrated in FIG. 7 in response to a falling edge of the clock signal PCLK (S601). The serializer 210 may generate a mixed type packet 420 or 450 that may include information regarding timing parameters 440 and valid image data 423 or 453 based on the logic states of the signals shown in a timing diagram 430. The serializer 210 may transmit the generated packet 420 or 450 to the deserializer 230 via the second transmission line 213 (S602).

In FIG. 7, the part 531 may include information regarding the type of the packet 450 (e.g., information indicating whether the packet 450 is a mixed type). The part 532 may include information (e.g., Packet.header.data_first=2) indicating a total number of a first valid data. For example, the total number of a first valid data may be an amount of the first valid data. The part 533 may include information (e.g., Packet.header.front_porch_dur=0) indicating a length of a front porch duration. The part 534 may include information (e.g., Packet.header.vsync_dur=0) indicating a length of a VSDUR duration. The part 535 may include information (e.g., Packet.header.back_porch_dur=0) indicating a length of a BACK_ PORCH duration. The part 536 may include information (e.g., Packet.header.hrsep_dur=6) indicating a length of a HRSEP duration. The part 537 may include information (e.g., Packet.header.data_last=2) indicating a total number of a second valid data. For example, the total number of second valid data may be an amount of the second valid data. The number in each of the above parameters may correspond to n (where n is an integer) cycles of a clock signal PCLK and may be expressed with binary bits.

Figure 9:
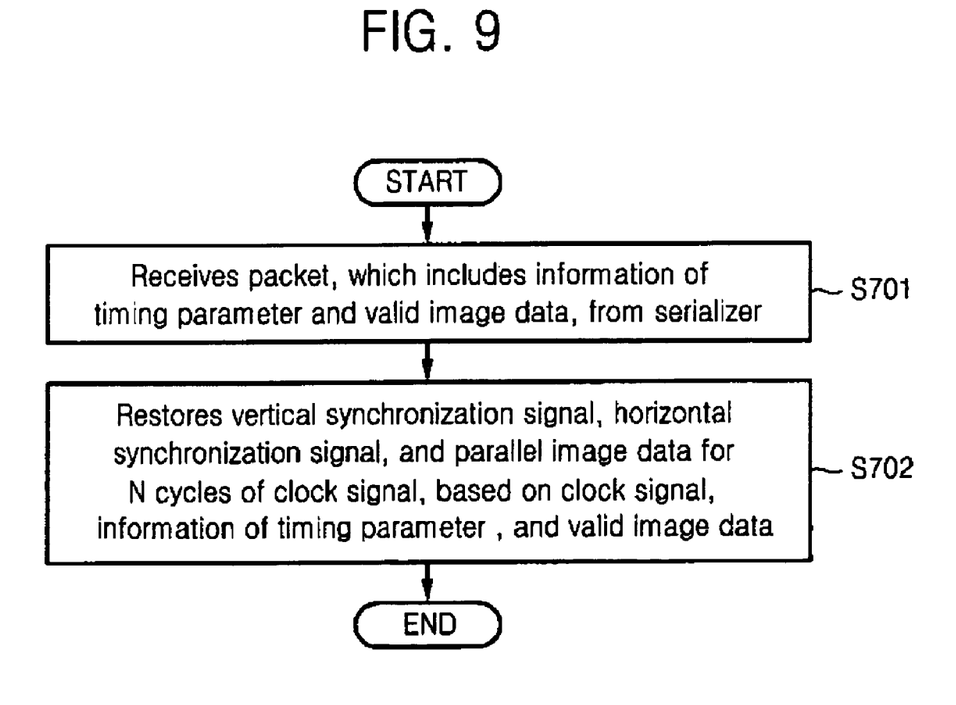
FIG. 9 is a flowchart illustrating a deserializing method according to an example embodiment.

FIG. 9 is a flowchart illustrating a deserializing method according to an example embodiment. Referring to FIGS. 3 through 9, the deserializer 230 may receive a packet 450 from the serializer 210 (S701). Subsequently, the deserializer 230 may restore signals and data equivalent to the vertical synchronization signal VSYNC, the horizontal synchronization signal HSYNC, and/or the parallel image data PDATA, which may be generated by an image sensor 20, for a given time (e.g., 10 cycles of the clock signal PCLK) based on the clock signal PCLK, the information included in the parts 531 through 537 (or 532 through 537) regarding timing parameters, and the data 453 (S702).

Figure 10:
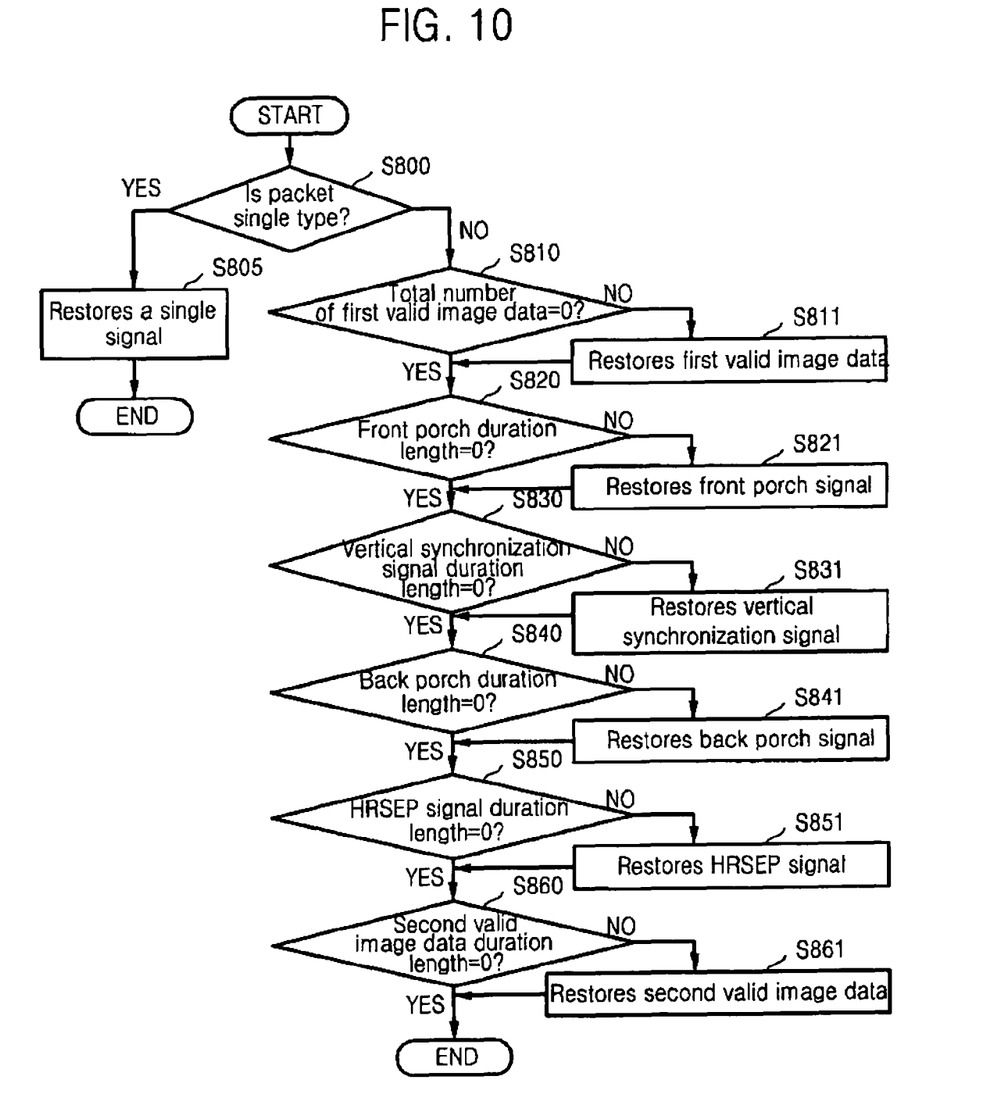
FIG. 10 is a flowchart illustrating a method of restoring a vertical synchronization signal, a horizontal synchronization signal, and/or parallel image data from a packet generated according to an example embodiment.

FIG. 10 is a flowchart illustrating a method of restoring a vertical synchronization signal, a horizontal synchronization signal, and parallel image data from a packet generated according to an example embodiment. Referring to FIGS. 3, 7, 9, and 10, the deserializer 230 may determine whether the received packet 450 is a uniform type, based on the information included in the part 531 of the packet header 451 of the packet 450 (S800).

If it is determined in operation S800 that the received packet 450 is the uniform type, the deserializer 230 may restore a single signal from the packet 450 as described with reference to FIG. 4 (S805). If it is determined in operation S800 that the received packet 450 is a mixed type, the deserializer 230 determines whether a total number of first valid image data is zero (S810). Subsequently, the deserializer 230 restores a first valid data from information in a part 532 and data 543 (S811) or determines whether a length of a front porch duration is 0 (zero) (S820), depending on the determination result obtained in operation S810.

The deserializer 230 restores a front porch duration from the information included in the part 533 of a packet header 451 (S821) or determines whether a length of a duration of a vertical synchronization signal is zero (S830), depending on the determination result obtained in operation S820.

The deserializer 230 restores the VSDUR duration from information in a part 534 of the packet header 451 (S831) or determines whether a length of the back porch duration is zero (S840), depending on the determination result obtained in operation S830. Subsequently, the deserializer 230 restores a back porch duration from information in a part 535 of the packet header 451 (S841) or determines whether a length of a HRSEP duration is zero (S850), depending on the determination result obtained in operation S840.

The deserializer 230 restores a HRSEP duration from information in a part 536 of the packet header 451 (S851) or determines whether a length of a duration of a second valid image data is zero (S860), depending on the determination result obtained in operation S850. Subsequently, the deserializer 230 restores a second valid image data from information in a part 537 of the packet header 451 and the data 543 (S861) or completes deserialization, depending on the determination result obtained in operation S860.

With a serializing method according to an example embodiment, it is possible to serialize and transmit a clock signal, a vertical synchronization signal, a horizontal synchronization signal, and/or parallel image data corresponding to a sensed image output from an image sensor.

In a deserializing method according to an example embodiment, a deserializer may recognize a length of a packet, and thus may restore signals output from an image sensor through deserialization, based on information regarding timing parameters of the packet and information of valid image data.

In a serializing method and a deserializing method according to example embodiments, a serial-line efficiency of transmitting serialized packets may be relatively higher than in a conventional method which a vertical synchronization signal, a horizontal synchronization signal, and parallel image data are serialized and transmitted at each edge of a clock signal.

Further, in a serializing method and a deserializing method according to example embodiments, a vertical synchronization signal and a horizontal synchronization signal may not be transmitted in a duration in which valid image data is transmitted, thereby reducing the bandwidth of serial line during data transmission. Also, even if timing parameters are changed, the changed timing parameters may be reflected in deserialization.

With some example embodiments having thus been described, it will be obvious that the same may be varied in many ways. Such variations are not to be regarded as a departure from the spirit and scope of these example embodiments, and all such modifications are intended to be included within the scope of example embodiments.

What is claimed is:

1. A method of serializing signals output from an image sensor, comprising:
    sampling a vertical synchronization signal, a horizontal synchronization signal, and parallel image data output from the image sensor, at a first edge of a clock signal, for n cycles of the clock signal, where n is an integer; and
    generating a packet including information regarding a duration of each timing parameter in a header of the packet and valid image data based on a sampling result, wherein
    the duration of said each timing parameter is variable, and
    the information regarding the duration of said each timing parameter includes at least one of:
        information regarding an amount of a first valid image data,
        information regarding a length of a front porch duration,
        information regarding a length of duration of an active state of the vertical synchronization signal,
        information regarding a length of a back porch duration,
        information regarding a length of duration of a deactive state of the horizontal synchronization signal, the deactive state is between adjacent activated horizontal synchronization signals while the vertical synchronization signal is deactivated, and
        information regarding an amount of a second valid image data.

2. The method of claim 1, wherein the information regarding timing parameters further includes information regarding a type of the packet.

3. The method of claim 1, wherein each of lengths is represented by cycles of the clock signal.

4. A method of processing signals comprising:
    the method of claim 1;
    receiving the packet including the information regarding the duration of said each timing parameter and valid image data from the image sensor; and
    restoring the vertical synchronization signal, the horizontal synchronization signal, and the parallel image data for n cycles of the clock signal based on at least one of the clock signal, the information regarding the duration of said each timing parameter, and the valid image data.

5. The method of claim 4, further comprising:
    transmitting the clock signal via a first transmission line and the packet via a second transmission line.

6. A method of deserializing signals output from a serializer, comprising:
    receiving a packet including information regarding a duration of each timing parameter in a header of the packet and valid image data from an image sensor; and
    restoring a vertical synchronization signal, a horizontal synchronization signal, and parallel image data for n cycles of a clock signal based on at least one of the clock signal, the information regarding the duration of said each timing parameter, and the valid image data, wherein
    the duration of said each timing parameter is variable, and
    the information regarding the duration of said each timing parameter includes at least one of:
        information regarding an amount of a first valid image data,
        information regarding a length of a front porch duration,
        information regarding a length of duration of an active state of the vertical synchronization signal,
        information regarding a length of a back porch duration,
        information regarding a length of duration of a deactive state of the horizontal synchronization signal, the deactive state is between adjacent activated horizontal synchronization signals while the vertical synchronization signal is deactivated, and information regarding an amount of a second valid image data.

7. The method of claim 6, wherein the information regarding the duration of said each timing parameter further includes information regarding a type of the packet.

8. An apparatus for processing data, comprising:
a serializer for sampling a vertical synchronization signal, a horizontal synchronization signal, and parallel image data, which are output from an image sensor, at a first edge of a clock signal for n cycles of the clock signal, and for generating a packet including information regarding a duration of each timing parameter in a header of the packet and valid image data, based on a sampling result, where n is an integer, and wherein
the duration of said each timing parameter is variable, and
the information regarding the duration of said each timing parameter includes at least one of:
information regarding an amount of a first valid image data,
information regarding a length of a front porch duration,
information regarding a length of duration of an active state of the vertical synchronization signal,
information regarding a length of a back porch duration,
information regarding a length of duration of a deactive state of the horizontal synchronization signal, the deactive state is between adjacent activated horizontal synchronization signals while the vertical synchronization signal is deactivated, and
information regarding an amount of a second valid image data.

9. The apparatus of claim 8, wherein the image sensor generates and outputs the clock signal, the vertical synchronization signal, the horizontal synchronization signal, and the parallel image data in response to a sensed image.

10. The apparatus of claim 8, wherein the information regarding the duration of said each timing parameter further includes information regarding a type of the packet.

11. The apparatus of claim 8, wherein each of lengths is represented by cycles of the clock signal.

12. The apparatus of claim 8, further comprising:
a deserializer for receiving the packet and restoring the vertical synchronization signal, the horizontal synchronization signal, and the parallel image data for the n cycles of the clock signal based on at least one of the clock signal, the information regarding the duration of said each timing parameter, and the valid image data.

13. The apparatus of claim 12, further comprising:
a first transmission line and a second transmission line, where the clock signal is transmitted on the first transmission line and the packet is transmitted on the second transmission line.

14. The apparatus of claim 12, further comprising:
a camera processor for processing an image sensed by the image sensor, based on the clock signal, the restored vertical synchronization signal, the restored horizontal synchronization signal, and the restored parallel image data.

15. An apparatus for processing data, comprising:
a deserializer for receiving a packet comprising information regarding a duration of each timing parameter in a header of the packet and valid image data, and for restoring a vertical synchronization signal, a horizontal synchronization signal, and parallel image data for n cycles of a clock signal based on at least one of the clock signal, the information regarding the duration of said each timing parameter, and the valid image data, where n is an integer, and wherein
the duration of said each timing parameter is variable, and
the information regarding the duration of said each timing parameter includes at least one of:
information regarding an amount of a first valid image data,
information regarding a length of a front porch duration,
information regarding a length of duration of an active state of the vertical synchronization signal,
information regarding a length of a back porch duration,
information regarding a length of duration of a deactive state of the horizontal synchronization signal, the deactive state is between adjacent activated horizontal synchronization signals while the vertical synchronization signal is deactivated, and
information regarding an amount of a second valid image data.

16. The apparatus of claim 15, further comprising:
a camera processor for processing an image sensed by an image sensor, based on the clock signal, the restored vertical synchronization signal, the restored horizontal synchronization signal, and the restored parallel image data.

17. A system for processing data, comprising:
an image sensor for sensing an image, and for generating and outputting a clock signal, a vertical synchronization signal, a horizontal synchronization signal, and image data corresponding to the sensed image;
a serializer for sampling the vertical synchronization signal, the horizontal synchronization signal, and parallel image data, at a first edge of the clock signal for n cycles of the clock signal, and for generating a packet including information regarding a duration of each timing parameter in a header of the packet and valid image data, based on a sampling result, where n is an integer;
a first transmission line for transmitting the clock signal;
a second transmission line for transmitting the packet;
a deserializer for receiving the packet output from the serializer, and for restoring the vertical synchronization signal, the horizontal synchronization signal, and the parallel image data for the n cycles of the clock signal, based on at least one of the clock signal, the information regarding the duration of said each timing parameter, and the valid image data; and
a camera processor for processing the sensed image based on the vertical synchronization signal, the horizontal synchronization signal, and the parallel image data output from the deserializer, wherein
the duration of said each timing parameter is variable, and
the information regarding the duration of said each timing parameter includes at least one:
information regarding an amount of a first valid image data;
information regarding a length of a front porch duration;
information regarding a length of duration of an active state of the vertical synchronization signal;
information regarding a length of a back porch duration;
information regarding a length of duration of a deactive state of the horizontal synchronization signal, the deactive state is between adjacent activated horizontal synchronization signals while the vertical synchronization signal is deactivated; and
information regarding an amount of a second valid image data.

* * * * *